United States Patent [19]
Watanabe et al.

[11] Patent Number: 5,559,774
[45] Date of Patent: Sep. 24, 1996

[54] OPTICAL DISC REPRODUCING APPARATUS WHICH EMPLOYS A BINARY DETECTOR FOR THE OUTER TRACKS AND A TERNARY DETECTOR FOR THE INNER TRACKS

[75] Inventors: Tetsu Watanabe, Tokyo; Tamotsu Yamagami; Yoshiyuki Urakawa, both of Kanagawa, all of Japan

[73] Assignee: Sony Corporation, Tokyo, Japan

[21] Appl. No.: 795,724

[22] Filed: Nov. 21, 1991

[30] Foreign Application Priority Data

Nov. 27, 1990 [JP] Japan .................... 2-320764

[51] Int. Cl.⁶ .................................. G11B 5/09
[52] U.S. Cl. .......................... 369/47; 369/59
[58] Field of Search .................... 369/47, 59, 60, 369/48, 50, 53, 58; 360/41, 45, 40

[56] References Cited

U.S. PATENT DOCUMENTS 3,840,892  10/1974  Hayashi .................... 360/41
4,631,713  12/1986  Romeas et al. .................... 369/54

Primary Examiner—Georgia Y. Epps
Assistant Examiner—P. W. Huber
Attorney, Agent, or Firm—Limbach & Limbach L.L.P.; Philip M. Shaw, Jr.

[57] ABSTRACT

An apparatus reproducing signals recorded on an optical disc rotated at a constant angular velocity. The apparatus employs a binary detector for forming digital data by comparing the reproduced signal with a predetermined threshold level, and a ternary detector for forming reproduced data from two series of digital data detected by comparing the reproduced signal with two different threshold levels of predetermined values. The reproduced data from an outer portion of the disc is detected by the binary detector, while the reproduced data from an inner portion of the disc is detected by the ternary detector. The playback output is selectively switched in response to an address signal of a specific track where the phase margin of the reproduced data detected by the binary detector and the phase margin of the reproduced data detected by the ternary detector becomes substantially equal to each other.

8 Claims, 9 Drawing Sheets

FIG. 2
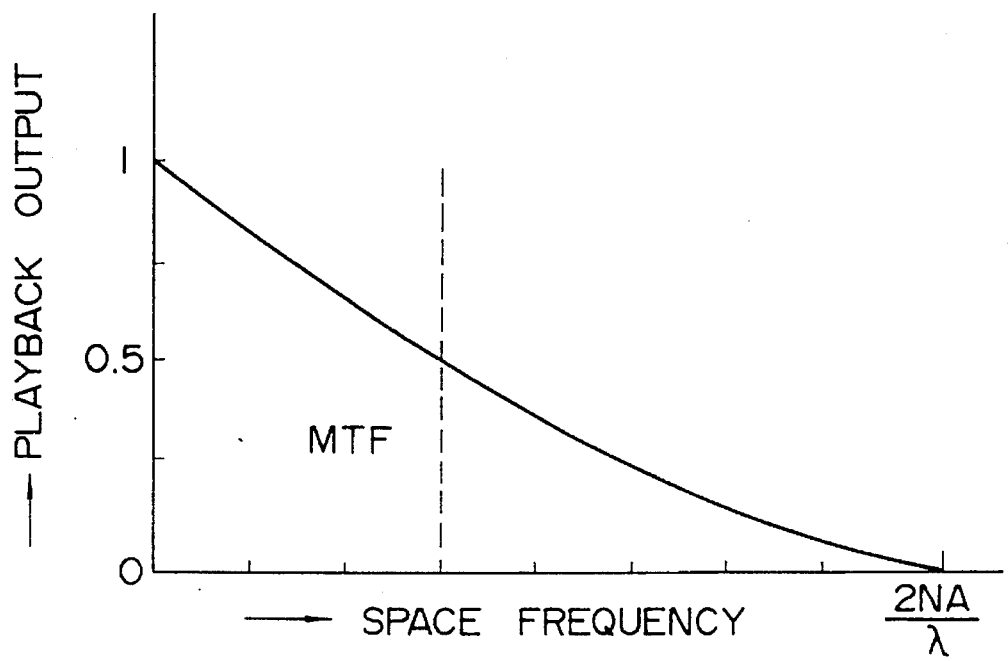
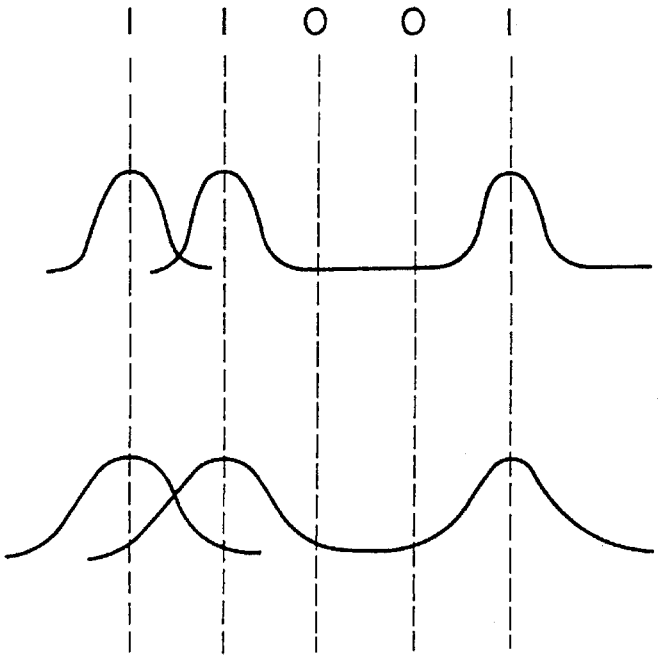
FIG. 3(a)
FIG. 3(b)

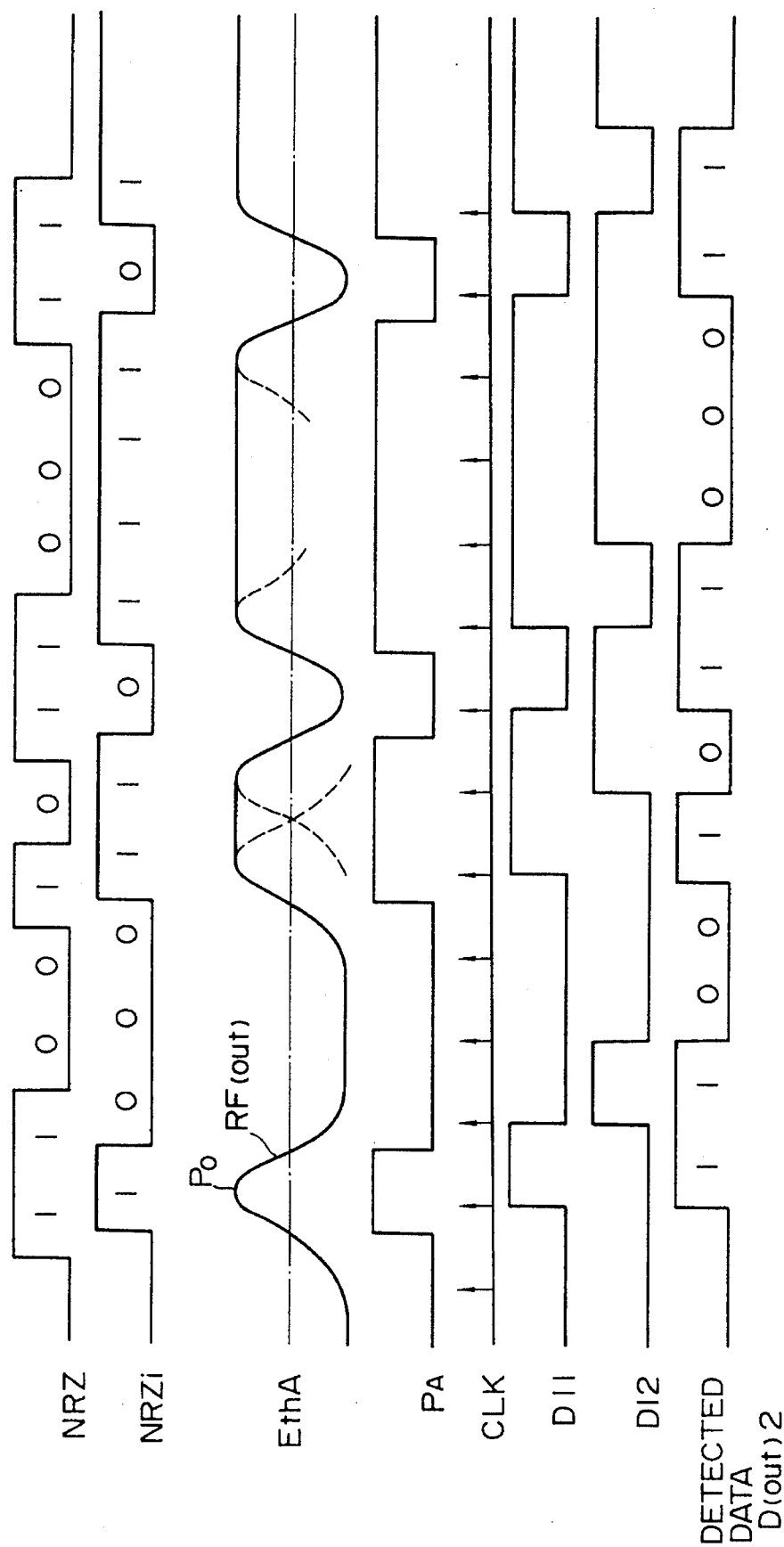

F I G. 8(a)
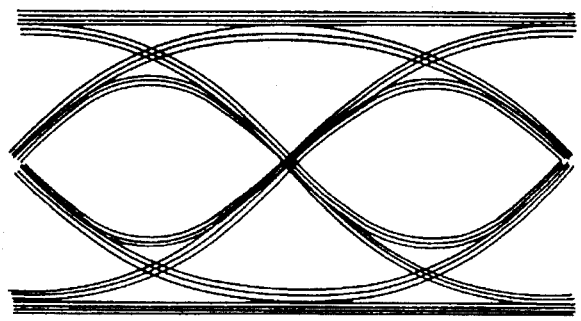
F I G. 8(b)
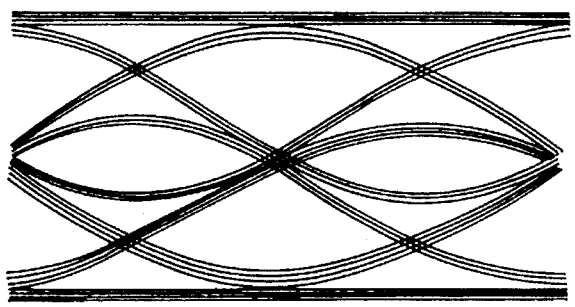
F I G. 8(c)
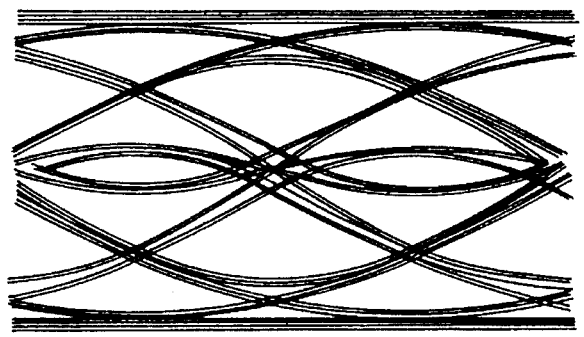

OPTICAL DISC REPRODUCING APPARATUS WHICH EMPLOYS A BINARY DETECTOR FOR THE OUTER TRACKS AND A TERNARY DETECTOR FOR THE INNER TRACKS

BACKGROUND OF THE INVENTION

1. Field of the Invention

The present invention relates to a disc signal reproducing method adapted for use in reading data from an optical disc which is driven for playback at a constant angular velocity.

2. Description of the Prior Art

In an optical disc apparatus for reading data from an optical disc by irradiating a laser beam thereto and causing intensity changes or phase changes of the reflected light, there exists a disadvantage that, in a high density recording mode, a bit rate (space frequency of minimum bit) recorded on tracks of the optical disc is raised to consequently narrow a phase margin (detection window margin) in a data detector of a playback system.

Particularly in a CAV (constant angular velocity) disc where the rotation rate is kept constant, the bit rate of data recorded on an inner track Tin of the disc D is higher than that on an outer track Tout correspondingly to the radii r1 and r2 thereof as illustrated in FIG. 7, so that the inter-code interference of the reproduced data becomes greater toward the innermost portion of the disc.

Therefore, when a playback advances from an outer track to an inner track, the eye pattern of a reproduced RF signal is changed to be narrower as illustrated in FIGS. 8a, 8b and 8c, and the data error rate detected from such eye pattern tends to increase.

In FIG. 9, a solid line (A) represents the trend of a phase margin (detection window margin) in detecting digital data obtained by first recording NRZ data, which is recordable with a relatively high density, at one clock rate on an optical disc whose rotation angle is constant, and then digitizing the reproduced RF signal by a binary detector. In the graph of FIG. 9, the abscissa represents the recording density by the pit length $\lambda$ ($\mu$m) of a minimum bit Pmin, and the ordinate represents changes in the phase margin of a clock signal when detecting the binary data from the RF signal on the basis of a threshold level determined at the center of the eye pattern.

As will be understood from the graph, on the outer track where the minimum bit interval of the data is about 1 micron, the eye pattern of the reproduced RF signal is such as illustrated in FIG. 8a, and the phase margin for detection is about 0.8 which indicates a considerable allowance. However, when the minimum bit interval becomes close to 0.5 micron on the inner portion of the optical disc, the eye pattern of the reproduced RF signal is so changed as illustrated in FIG. 8c, whereby the phase margin for detection is sharply reduced to be smaller than 0.5. (The phase margin signifies an allowable range of the detection window phase for maintaining the data error rate under a predetermined value in a playback operation.)

Consequently, for reproducing the signal in a manner to maintain the data error rate below $10^{-7}$ or so during playback of the disc where the angular velocity is constant as mentioned, it is extremely severe for the detector to retain a sufficient phase margin on the inner portion of the disc, hence necessitating strict quality control of the optical disc and bringing about an increased cost in the playback circuit.

Furthermore, since the recording capacity of the optical disc as a whole is limited by the recording density on the inner portion, the data quantity recordable on a single optical disc is restricted by the recording surface density on the inner portion and is therefore not increasable to a sufficiently great value.

OBJECT AND SUMMARY OF THE INVENTION

It is an object of the present invention to provide an improved disc signal reproducing method which is capable of enhancing a recording density on an optical disc and lowering a data error rate under a predetermined value over the entire disc so as to facilitate quality control of the optical disc as well as to reduce the production cost of a playback circuit.

According to one aspect of the present invention, there is provided an apparatus for reproducing signals from an optical disc, comprising a binary detector means supplied with first reproduced data from an outer portion of the disc for comparing the level of the first reproduced data with a predetermined threshold level to produce first detected data; and a partial response ternary detector means supplied with second reproduced data from an inner portion of the disc for comparing the level of the second reproduced data with two different threshold levels to form two binary digital signals, extracting two series of pulse trains from the two binary digital signals, and producing second detected data from the two series of pulse trains.

According to another aspect of the invention, there is further provided switch means supplied with the first detected data and the second detected data for producing an output by selectively switching between the first detected data and the second detected data in response to an address signal of a specific track on which a phase margin of the first reproduced data detected by the binary detector and a phase margin of the second reproduced data detected by the ternary detector become substantially equal to each other.

Thus, in reproducing the recorded data from the optical disc rotated at a constant angular velocity, the binary detector for detecting the binary digital data compared with a predetermined threshold level is operated for the RF signal obtained from an outer track where the recording density is relatively low; while the ternary detector for detecting the original data from the two series of the digital data compared with two threshold levels is operated for the RF signal obtained from an inner track where the recording density is relatively high. Therefore it becomes possible to prevent a disadvantage of narrowing the phase margin of a clock signal used for detection of the data.

The above and other features and advantages of the present invention will become apparent from the following description which will be given with reference to the illustrative accompanying drawings.

BRIEF DESCRIPTION OF THE DRAWINGS

FIG. 2 graphically shows the modulation transfer function (MTF) in playback of an optical disc;

FIGS. 3a and 3b are waveform timing charts for explaining inter-code interference;

FIGS. 5a and 5b are waveform timing charts of signals in the circuits of FIGS. 4a and 4b;

FIG. 6b is a waveform chart of a reproduced signal obtained from the equalizer of FIG. 6a;

FIGS. 8a, 8b and 8c illustrate eye patterns of a reproduced RF signal; and

DESCRIPTION OF THE PREFERRED EMBODIMENT

Hereinafter a preferred embodiment of the present invention will be described in detail with reference to the accompanying drawings.

Figure 1:
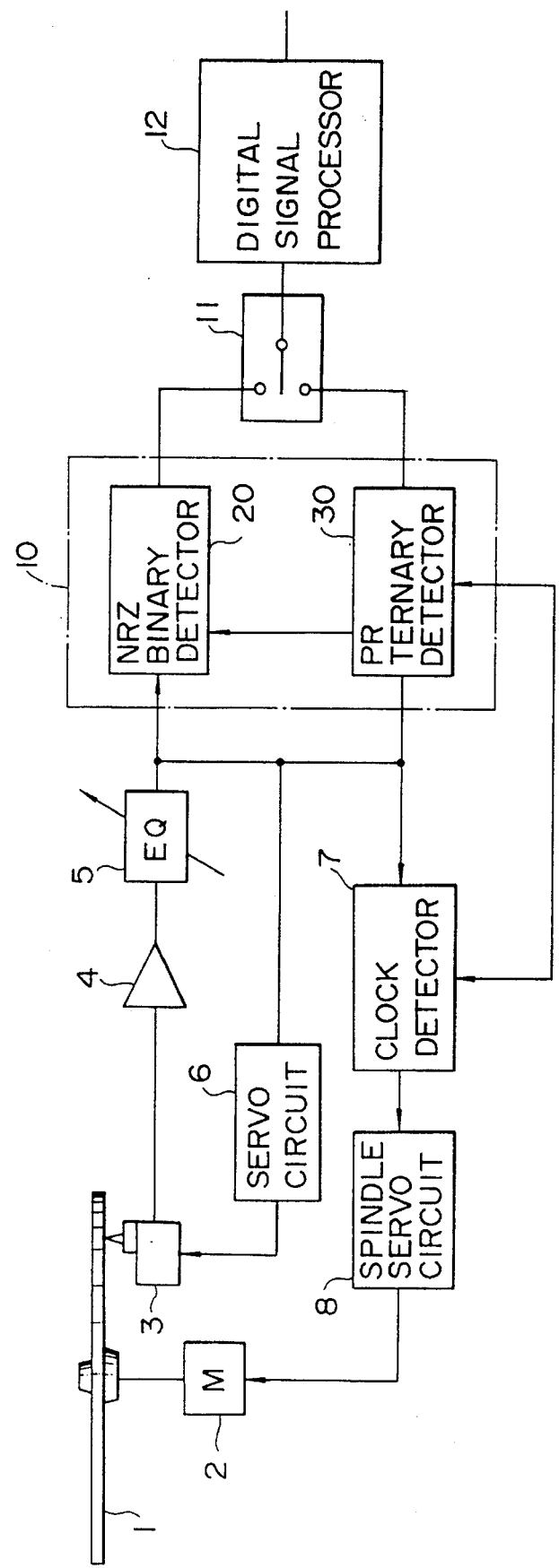
FIG. 1 is a schematic block diagram of an exemplary apparatus contrived to carry out the disc signal reproducing method of the present invention.

FIG. 1 is a block diagram schematically showing the constitution of an exemplary apparatus to carry out the signal reproducing method of the invention. In this diagram, there are included an optical disc 1 driven by a spindle motor 2 in such a manner that the rotation angle thereof is kept constant, and an optical head 3 equipped with a laser beam source and an optical element for irradiating the output of the laser beam source to the optical disc 1 and reading the recorded data from the reflected light.

An RF signal reproduced by the optical head 3 is outputted via an RF signal amplifier 4 and then is supplied to an equalizer 5 where the waveform is shaped.

The reproduced RF signal is supplied to an under-mentioned data detector 10 so that binary digital data is reproduced. Such data is partially supplied to a clock detector 7 composed of a PLL (phase-locked loop) circuit and so forth where a clock signal for the recorded data is detected, and simultaneously the clock signal thus detected is supplied to a spindle servo circuit 8 so as to control the rotation of the spindle motor 2. When the optical disc 1 is a magneto-optical one where the data is rewritable, clock pits formed previously on the recording surface of the disc are detected to produce a clock signal used for extraction of the data.

In addition, sample servo pits formed together with the clock pits are detected to produce a tracking error signal and a focus error signal by a servo circuit 6, and then tracking control and focus control for the optical head 3 are both executed in response to the output signal of the circuit 6.

Modulation of the data to be recorded on the optical disc 1 is performed in an NRZi mode which is achieved by preencoding an NRZ (non-return to zero) mode adapted for high density recording. When the data of such NRZi series are recorded on the optical disc 1 at one clock frequency, the pit interval of the data becomes long in an outer portion of the disc, while the pit interval becomes short in an inner portion of the disc.

Generally the modulation transfer function (MTF), which is one of the transfer characteristics of the optical disc, indicates such a low pass characteristic with a cutoff frequency 2NA/λ as shown graphically in FIG. 2 (in which NA stands for a numerical aperture, and λ for a laser wavelength).

Therefore, on the outer portion of the disc where the space frequency in a playback operation is relatively low, the data can be reproduced with the disc playback response of FIG. 2 regarded as an ideal low pass filter whose roll-off factor α is approximately 1. And despite any inter-code interference existing between mutually adjacent bits as shown in FIG. 3a, the pulse waveform response of the reproduced data is such that codes "1" and "0" can be discriminated properly with a wide phase margin by satisfying the Nyquist frequency condition.

Meanwhile on the inner portion of the disc where the space frequency is high, the disc playback frequency characteristic is deteriorated to consequently vary the pulse waveform response of the reproduced data in such a manner that a great inter-code interference occurs between mutually adjacent bits as shown in FIG. 3b, whereby the phase margin for extraction of the data is rendered narrow to eventually raise the data error rate.

In the present invention, as a detector 10 for extracting the data out of the RF signal reproduced from the outer and inner tracks on the disc, there are provided an NRZ binary detector 20 for detecting the data after slicing the reproduced signal at a predetermined threshold level, and a partial response ternary detector 30 (hereinafter referred to as PR ternary detector) for comparing the reproduced RF signal with two different threshold levels to form two binary digital signals and producing detected data from the two series of pulse trains extracted out of such digital signals.

The outputs of both the NRZ binary detector 20 and the PR ternary detector 30 are supplied to a digital signal processor 12 via a switch 11 which is selectively changed in accordance with the outer portion and the inner portion of the disc, whereby operations of detecting, correcting and decoding any error data are performed.

Figure 4A:
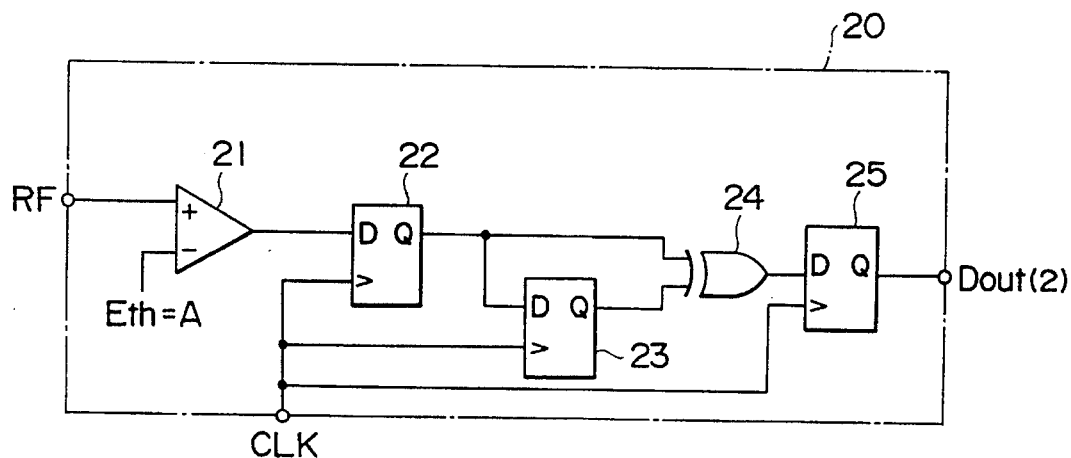
FIGS. 4a and 4b are circuit diagrams of an exemplary binary detector and an exemplary ternary detector respectively.
Figure 4B:
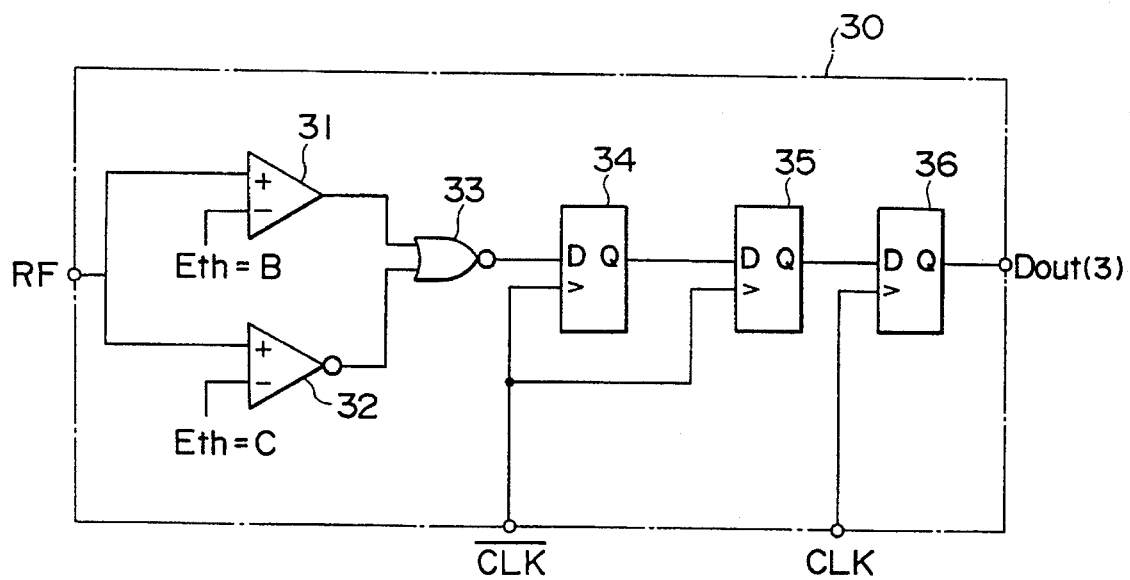

FIGS. 4a and 4b respectively show specific examples of the NRZ binary detector 20 and the PR ternary detector 30 which constitute the aforementioned data detector 10.

In these diagrams, there are included a comparator 21 for comparing the RF signal, from which the direct-current component has been removed, with a first threshold signal $E_{th}A$; D-flip flop circuits 22, 23, 25; and an ex-OR circuit 24.

Also shown are comparators 31, 32 whose comparison values are a first threshold level $E_{th}B$ and a second threshold level $E_{th}C$ respectively; a NOR circuit 33; and D-flop flop circuits 34, 35, 36.

Now the operation of the NRZ detector 20 activated in conformity with the outer portion of the disc will be described below with reference to a waveform timing chart of FIG. 5a.

The data of NRZ series preencoded when being recorded on the optical disc 1 and are thereby formed into data of NRZi series.

The recorded data satisfies the Nyquist frequency condition on the outer portion of the disc where the MTF is relatively high, and the waveform $RF_{(out)}$ of the reproduced RF signal has a predetermined peak value $P_0$ at a "1" level and becomes substantially 0 at the minimum interval of mutually adjacent bits.

Therefore, a pulse train PA is outputted from the comparator 21 whose comparison voltage is the first threshold signal $E_{th}A$ preset at the intermediate of the waveform $RF_{(out)}$.

The pulse train $P_A$ is read out at an intermediate point of bits in accordance with a clock pulse CLK supplied to the D-flip flop circuit 22, so that data D11 is outputted therefrom.

Subsequently the data D11 thus obtained is delayed by the next D-flip flop circuit 23 for a time corresponding to one bit and is thereby turned to data D12, and then an exclusive logical sum of the former data D11 and the delayed data D12 is produced by the ex-OR circuit 24, whereby the data of NRZ series in the recording mode is outputted as detected data $D_{out(2)}$ from the D-flip flop circuit 25.

Figure 5B:
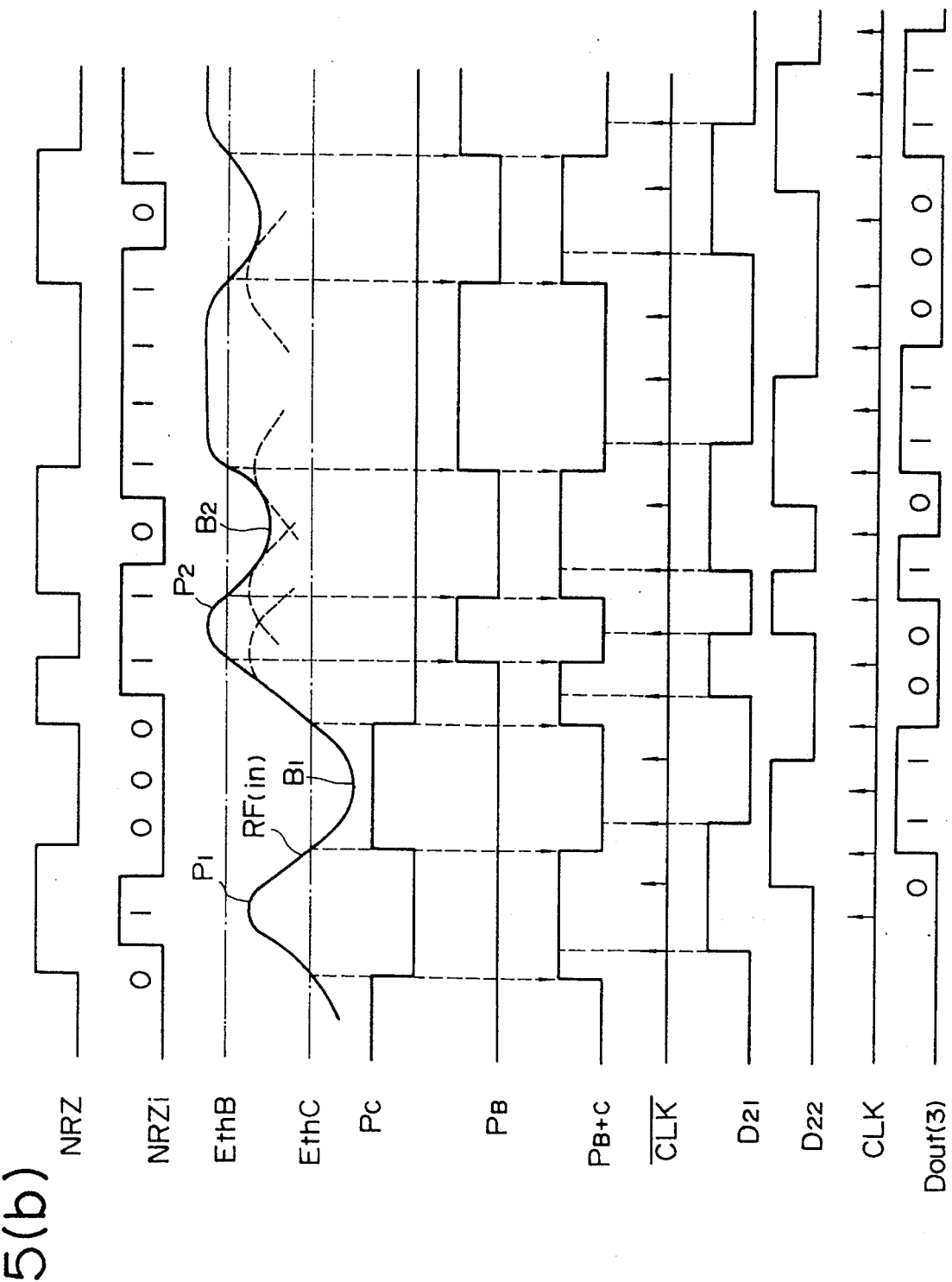

With advance of the playback from any outer track of the optical disc toward the innermost track thereof, the MTF of the optical disc is deteriorated to consequently increase the inter-code interference in the reproduced RF signal waveform, thereby lowering the peak value P1 of the bit "1" as shown in FIG. 5b or turning the peak value to P2 when mutually adjacent bits are successive "1". In this case, the bottom value is turned to B2 relative to the next bit "0" signal and comes to have a level different from the bottom value B1 of a single pulse signal. And the eye pattern of the reproduced RF signal is narrowed with an increase of the inter-code interference. Therefore the phase margin of the detection window indicative of the position to extract the data is also narrowed so that, as shown graphically in FIG. 9, the phase margin for ensuring the data error rate above a predetermined value is sharply reduced in the NRZ binary detector from a certain track radius on the inner portion of the disc. The minimum bit interval on the track radius relative to occurrence of such sharp margin reduction is 0.6 micron or so for example, and on any disc portion inside of the relevant track, it is difficult to properly extract the data while maintaining the data error rate under the predetermined value.

Figure 9:
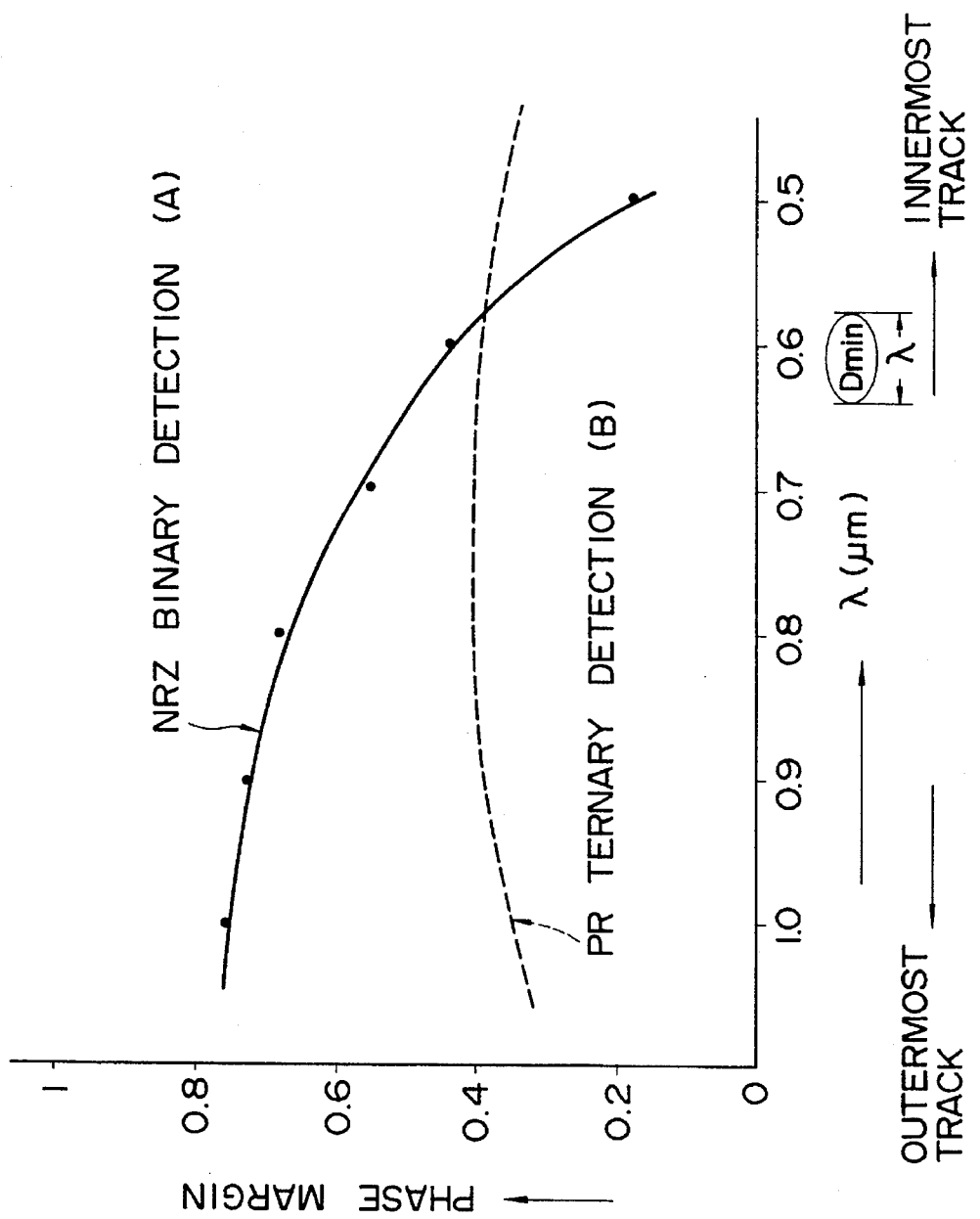
FIG. 9 graphically shows the relationship between a phase margin and a recording density.

In view of the phenomenon mentioned, the present invention is so contrived that, in playback of any track inside the limit of data extraction, the detected data $P_{out(3)}$ of the PR ternary detector 30, where the reduction of the phase margin is relatively small in any track on the inner disc portion, is selected by and outputted from the switch 11 as represented by a dotted line (B) in FIG. 9.

Now the operation of the PR ternary detector 30 shown as a specific example in FIG. 4b will be described below with reference to a waveform timing chart of FIG. 5b.

In reproduction of the data recorded with NRZi codes, the peak value in the waveform $RF_{(in)}$ of each reproduced pulse is lowered with deterioration of the MTF on the inner portion of the disc, and simultaneously the waveform of the reproduced RF signal tends to spread at the foot as shown. Accordingly the peak level P2 in the portion of successive "1" becomes high as described, but the "0" data included in the successive "1" is retained at the foot of the single "1" data without being lowered.

It follows that, in such reproduced RF signal, the eye pattern at the center is contracted as illustrated in FIG. 8c.

In the PR ternary detector 30 of FIG. 8b, the reproduced RF signal $RF_{(out)}$ is supplied to the two comparators 31 and 32 whose comparison voltages are a second threshold signal $E_{th}B$ and a third threshold signal $E_{th}C$ respectively, so that the above RF signal is sliced to produce pulses $P_B$ and $P_C$ of two series.

The two pulse trains $P_B$ and $P_C$ thus obtained are supplied to the NOR circuit 33, where a logical sum thereof is taken to produce a composite pulse train $P_{B+C}$.

The composite pulse train $P_{B+C}$ is extracted by the D-flip flop circuit 34 which is supplied with an inverted clock signal $\overline{CLK}$ having a 90° phase difference from the clock signal CLK, whereby data D21 is obtained. Subsequently the data D21 is supplied to the D-flop flop circuit 35 to become data D22 delayed for a time of one bit, which is then extracted in accordance with the clock signal CLK to become detected data $D_{out(3)}$.

The detected data $D_{out(3)}$ becomes the same as the aforementioned detected data $D_{out(2)}$ obtained from the NRZ binary detector 20.

As described above, two threshold levels $E_{th}B$ and $E_{th}C$ are preset in the PR ternary detector 30 for slicing the reproduced RF signal where inter-code interference is existent, so that it is rendered possible to detect with facility the eye pattern which is not easily extractable otherwise by the binary detector 20, and the phase margin can be widened by properly selecting adequate values for the threshold levels ($E_{th}B$, $E_{th}C$)

Therefore, in the graph of FIG. 9 representing the phase margin, the specific track position is detected, from the address data or the like, on the disc where the phase margin (A) obtained by the NRZ binary detector 20 and the phase margin (B) by the ternary detector 30 become substantially equal to each other, and the switch 11 is selectively changed in conformity with the relevant track number. Then it is facilitated to prevent any sharp reduction of the phase margin, at the time of reading the data from the optical disc, on the inner disc portion where the recording density is relatively high, and further to maintain the data error rate continuously above the predetermined value over the entire surface of the disc.

The data error rate is not raised despite deterioration of the MTF on the inner portion of the disc, so that the production cost of the playback circuit can be curtailed. Furthermore, in enhancing the recording density on the outer portion of the disc, it is still possible to attain a sufficient playback capability to consequently achieve a desired increase of the data quantity recordable on one disc.

It is to be noted that the PR ternary detector, which is also termed a duo binary detector of partial response class one, is not limited merely to the example mentioned in the embodiment and may be composed of any other suitable detection circuit on condition that it has a function of ternary detection.

Figure 6A:
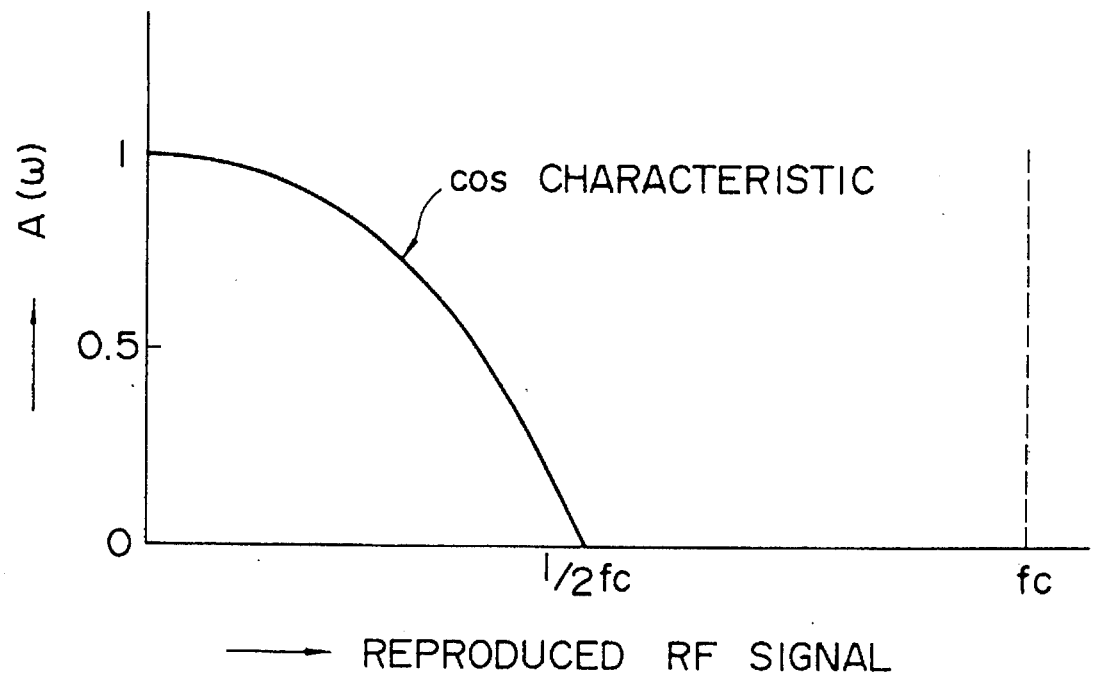
FIG. 6a graphically shows the characteristic of a playback equalizer in an inner portion of a disc.
Figure 6B:
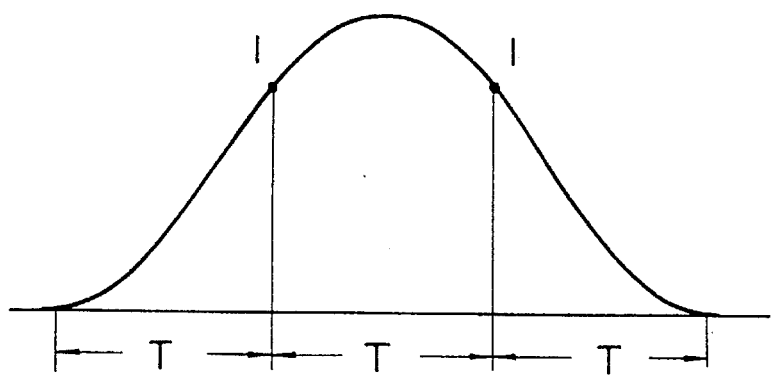
Figure 7:
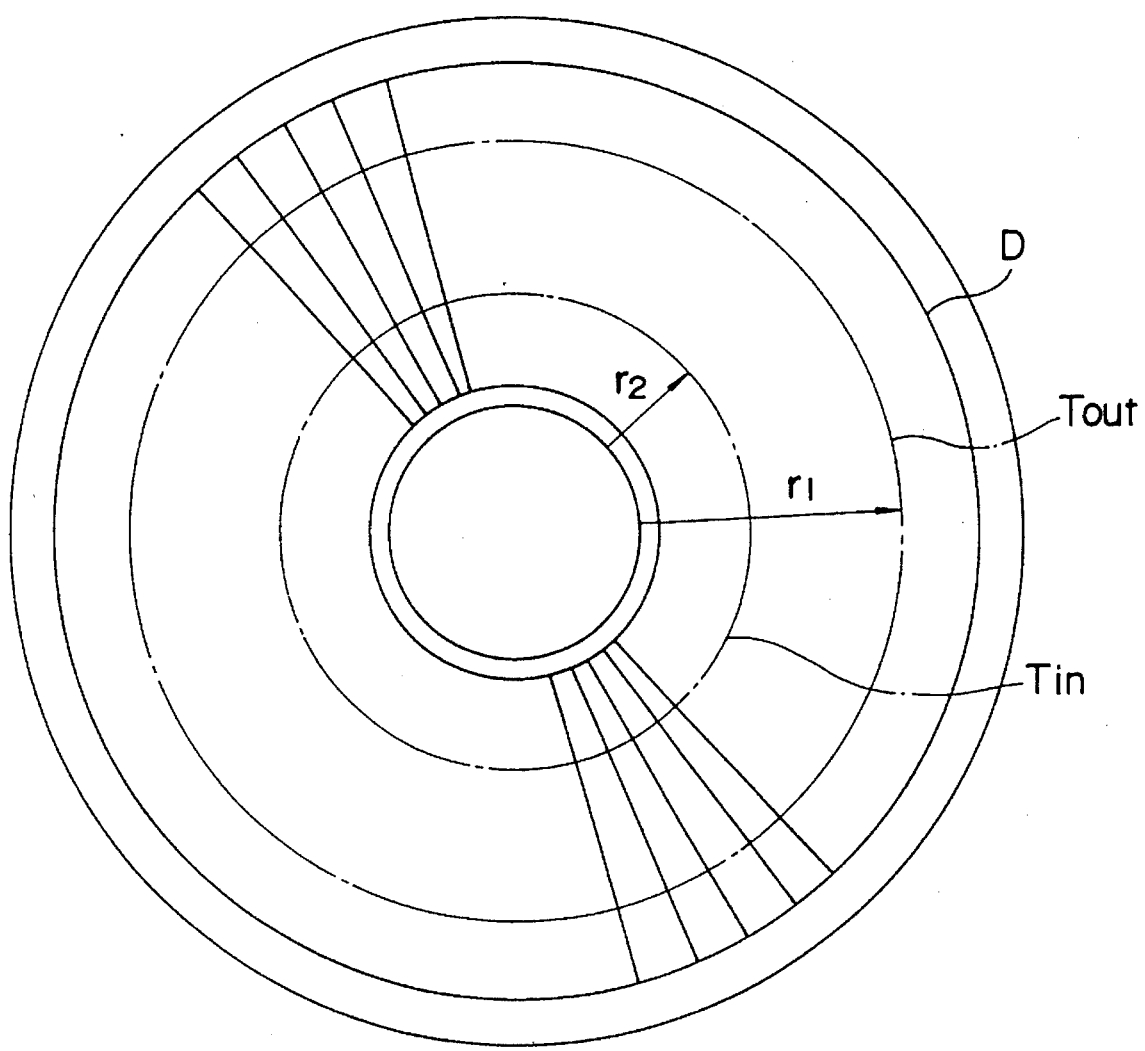
FIG. 7 illustrates a magneto-optical disc.

The frequency characteristic of the equalizer employed for shaping the waveform of the reproduced signal needs to be correctable in several steps depending on the preset playback track positions in such a manner that the roll-off factor α in an ideal low pass characteristic is within a range of 0.5 to 1. When ternary detection is performed on the inner portion of the disc, it is preferred that the pass frequency characteristic is so changed as to indicate a COS characteristic curve as graphically shown in FIG. 6a, and the reproduced RF signal is approximated to a partial response (1, 1) as shown in FIG. 6b.

It is to be understood that the signal reproducing method of the present invention is not limited merely to application to an optical disc alone and is also applicable to detection of data reproduction from any rotary recording medium where the linear velocity thereof is changed relatively.

As described hereinabove, according to the disc signal reproducing apparatus of the present invention for playback of an optical disc where a recording density on an inner track is higher than that on an outer track, there are provided a binary detector and a ternary detector which are switchable in operation at the position of a specific track, so that the recording density restricted by the conventional binary detection means can be further raised on the optical disc, and the data error rate can be easily retained under a predetermined value over the entire surface of the disc, hence alleviating the quality control of the optical disc and reducing the production cost of the playback circuit.

What is claimed is:

1. An apparatus for reproducing signals from an optical disc, comprising:

a binary detector means supplied with first reproduced data from an outer portion of the disc for comparing the level of the first reproduced data with a predetermined threshold level to produce non-return to zero (NRZ) data as first detected data; and a partial response ternary detector means supplied with second reproduced data from an inner portion of the disc for comparing the level of the second reproduced data with two different threshold levels to form two binary digital signals, extracting two series of pulse trains from the two binary digital signals, and producing second detected data from the two series of pulse trains; and switch means supplied with the first detected data and the second detected data for producing an output by selectively switching between the first detected data and the second detected data.

2. An apparatus for reproducing signals form an optical disc according to claim 1, wherein the ternary detector means includes:

a first comparator having one input supplied with the first reproduced data and a another input supplied with a first predetermined threshold level for outputting a first pulse train;

a second comparator having one input supplied with the first reproduced data and a another input supplied with a second predetermined threshold level for outputting a second pulse train;

a NOR gate supplied with the first pulse train and the second pulse train for outputting a logical sum of the first pulse train and the second pulse train;

a first flip-flop supplied with the output of the NOR gate and the clock signal for outputting a third pulse train;

a second flip-flop supplied with the third pulse train and the clock signal for outputting an fourth pulse train; and a third flip-flop supplied with the fourth pulse train and the clock signal for outputting non-return to zero data.

3. An apparatus for reproducing signals from an optical disc, comprising:

a binary detector means supplied with first reproduced data from an outer portion of the disc for comparing the level of the first reproduced data with a predetermined threshold level to produce first detected data;

a ternary detector means supplied with second reproduced data from an inner portion of the disc for comparing the level of the second reproduced data with two different threshold levels to form two binary digital signals, extracting two series of pulse trains from the two binary digital signals, and producing second detected data from the two series of pulse trains; and switch means supplied with the first detected data and the second detected data for producing an output by selectively switching between the first detected data and the second detected data in response to an address signal of a specific track on which a phase margin of the first reproduced data detected by the binary detector and a phase margin of the second reproduced data detected by the ternary detector become substantially equal to each other.

4. An apparatus for reproducing signals form an optical disc according to claim 3, wherein the ternary detector means includes:

a first comparator having one input supplied with the first reproduced data and another input supplied with a first predetermined threshold level for outputting a first pulse train;

a second comparator having one input supplied with the first reproduced data and another input supplied with a second predetermined threshold level for outputting a second pulse train;

a NOR gate supplied with the first pulse train and the second pulse train for outputting a logical sum of the first pulse train and the second pulse train;

a first flip-flop supplied with the output of the NOR gate and the clock signal for outputting a third pulse train;

a second flip-flop supplied with the third pulse train and the clock signal for outputting an fourth pulse train; and a third flip-flop supplied with the fourth pulse train and the clock signal for outputting non-return to zero data.

5. An apparatus for reproducing signals form an optical disc according to claim 3, wherein:

the binary detector means includes:

a first comparator having one input supplied with the first reproduced data and another input supplied with a first predetermined threshold level for outputting a first pulse train;

a first flip-flop supplied with the first pulse train and a clock signal from an external source for outputting a second pulse train;

a second flip-flop supplied with the second pulse train and the clock signal for outputting a third pulse train;

an exclusive OR gate supplied with the second and third pulse trains for producing a fourth pulse train; and a third flip-flop supplied with the fourth pulse train and the clock signal for outputting first non-return to zero data.

6. An apparatus for reproducing signals form an optical disc according to claim 5, wherein the ternary detector means includes:

a second comparator having one input supplied with the first reproduced data and another input supplied with a second predetermined threshold level for outputting a fifth pulse train;

a third comparator having one input supplied with the first reproduced data and another input supplied with a third predetermined threshold level for outputting a sixth pulse train;

a NOR gate supplied with the fifth pulse train and the sixth pulse train for outputting a logical sum of the fifth pulse train and the sixth pulse train;

a fourth flip-flop supplied with the output of the NOR gate and the clock signal for outputting a seventh pulse train;

a fifth flip-flop supplied with the seventh pulse train and the clock signal for outputting an eighth pulse train; and a sixth flip-flop supplied with the eighth pulse train and the clock signal for outputting second non-return to zero data.

7. An apparatus for reproducing signals from an optical disc, comprising:

a binary detector means supplied with first reproduced data from an outer portion of the disc for comparing the level of the first reproduced data with a predetermined threshold level to produce non-return to zero (NRZ) data as first detected data, the binary detector means including:

a first comparator having one input supplied with the first reproduced data and a another input supplied with a first predetermined threshold level for outputting a first pulse train;

a first flip-flop supplied with the first pulse train and a clock signal from an external source for outputting a second pulse train;

a second flip-flop supplied with the second pulse train and the clock signal for outputting a third pulse train;

an exclusive OR gate supplied with the second and third pulse trains for producing a fourth pulse train; and a third flip-flop supplied with the fourth pulse train and the clock signal for outputting first non-return to zero data;

a partial response ternary detector means supplied with second reproduced data from an inner portion of the disc for comparing the level of the second reproduced data with two different threshold levels to form two binary digital signals, extracting two series of pulse trains from the two binary digital signals, and producing second detected data from the two series of pulse trains; and switch means supplied with the first detected data and the second detected data for producing an output by selectively switching between the first detected data and the second detected data.

8. An apparatus for reproducing signals form an optical disc according to claim 7, wherein the ternary detector means includes:

a second comparator having one input supplied with the first reproduced data and another input supplied with a second predetermined threshold level for outputting a fifth pulse train;

a third comparator having one input supplied with the first reproduced data and another input supplied with a third predetermined threshold level for outputting a sixth pulse train;

a NOR gate supplied with the fifth pulse train and the sixth pulse train for outputting a logical sum of the fifth pulse train and the sixth pulse train;

a fourth flip-flop supplied with the output of the NOR gate and the clock signal for outputting a seventh pulse train;

a fifth flip-flop supplied with the seventh pulse train and the clock signal for outputting an eighth pulse train; and a sixth flip-flop supplied with the eighth pulse train and the clock signal for outputting second non-return to zero data.

* * * * *